United States Patent [19]

Peden et al.

[11] 4,032,161
[45] June 28, 1977

[54] POWER OPERATED CHUCK

[76] Inventors: John Richard Peden, Liphill Quay, Bere Ferrers, Devon; Derek Vivian Ivor Santillo, 66 Elm Road, Mannamead, Plymouth PL4 7BB, both of England

[22] Filed: Apr. 4, 1975

[21] Appl. No.: 565,318

[30] Foreign Application Priority Data

Apr. 5, 1974 United Kingdom ............. 15371/74

[52] U.S. Cl. .................................. 279/1 H; 279/4
[51] Int. Cl.² ........................................ B23B 31/30
[58] Field of Search ............. 279/4, 1 H, 118, 121; 60/DIG. 10, 52 VS, 491, 492; 91/476

[56] References Cited

UNITED STATES PATENTS

| 3,612,724 | 10/1971 | Smith | 60/52 VS |

FOREIGN PATENTS OR APPLICATIONS

| 193,685 | 12/1957 | Austria | 279/121 |
| 1,083,903 | 1/1955 | France | 279/4 |
| 1,107,731 | 1/1956 | France | 279/121 |
| 1,008,212 | 5/1952 | France | 279/4 |
| 249,913 | 5/1948 | Switzerland | 279/1 H |

*Primary Examiner*—Richard B. Lazarus
*Assistant Examiner*—William R. Briggs
*Attorney, Agent, or Firm*—Sughrue, Rothwell, Mion, Zinn & Macpeak

[57] ABSTRACT

A power operated chuck in which an actuator, such as a fluid pressure actuator, causes clamping or unclamping movements of the jaws in dependence on the position of a control member, in which the power for operation of the actuator is derived from rotation of the chuck on a shaft of a machine tool, the power source being housed within the chuck which is thus self contained and does not require a separate power source. In the embodiment described the power source is in the form of a plurality of fluid pressure pumps worked by a swash plate as the chuck rotates. Fluid pressure built up by the pumps is stored in a fluid pressure reservoir and used to drive the actuator.

6 Claims, 5 Drawing Figures

POWER OPERATED CHUCK

The present invention relates to a work holding chuck for a machine tool such as a lathe, capstan lathe milling machine or the like. In particular, the present invention relates to a power operated chuck capable of clamping to hold a workpiece, or unclamping to release a workpiece, in a single, power driven, stroke either inwardly, for bar stock, or outwardly, for tube stock as controlled by the movement of a control member.

Various different power driven chucks are known in the art; these are either pneumatically or hydraulically operated and in each case they rely for their power on a power supply separate from the driving motor of the machine tool. Known power operated chucks are both expensive and difficult to mount on a machine tool.

The power source for known pneumatically operated chucks is normally an air compressor which operates to provide a supply of compressed air, via a control valve or a plurality of control valves, to energise at least one pneumatic actuator which acts, via a suitable linkage, on a draw bar or tube which passes through the hollow spindle of the machine. The draw bar or tube links the actuator to the operating mechanism of a chuck the jaws of of which are caused to open or close radially of the axis of the machine tool spindle by movement of the draw bar or tube axially of the machine tool spindle. Known hydraulic chucks operate in a similar manner.

One of the disadvantages of the known type of power operated chuck is that the draw bar or tube which extends axially of the hollow machine tool spindle, obstructs, or at least severely restricts, the space available within the spindle for long bar work.

Another disadvantage is that the assembly and setting up of the known types of power operated chucks takes considerable time and labour, and because of this known power chucks become, effectively, a part of the machine tool once fitted since, although they are nominally interchangeable, it has been found, in practice, that it is not worth doing so due to the amount of labour involved and the length of time for which the machine is out of use in doing so.

An object of the present invention is to provide a power operated chuck which does not suffer from the disadvantages mentioned above, and in particular which does not obstruct the central bore of a hollow spindle machine, thereby allowing long bar work to be carried out. Another object of the invention is to provide a chuck which is readily interchangeable either with other power operated chucks of the same type, or with manually operated chucks so that different sizes of work may readily be accommodated on a single machine by quickly interchanging chucks of different size. A further object of the invention is to provide a power operated chuck which is robust, which does not require a power supply separate from the motor of the main spindle of the machine tool to which it is fitted, and which is considerably cheaper to manufacture and install than presently known power chucks.

According to one aspect of the present invention, there is provided a power operated work holding chuck mountable on a spindle of a machine tool, which derives power for operation from the rotation of a machine tool spindle when mounted thereon.

Preferably the chuck is fluid power operated and there are means within the body of the chuck for generating upon rotation of the chuck, fluid pressure for operating an actuator which moves the jaws of the chuck.

The advantages of the invention are that by generating fluid pressure as a result of rotation of the chuck it is possible to dispense with the complicated and expensive separate power source and power feeding transmissions for transferring the power from the source to the chuck itself. This allows the chuck to be constructed integrally as a self contained unit and this in turn permits the ready interchangeability mentioned above.

Preferably within the chuck body are means for storing fluid pressure generated upon rotation of the chuck by the said fluid pressure generating means.

In a preferred embodiment of the invention the jaws of the chuck are driven radially inwardly or outwardly by an axially movable double acting fluid pressure actuator, there being provided a plurality of control valves for feeding fluid pressure to the actuator to cause it to move selectively in one direction or the other. Alternatively, however, two separate single acting fluid pressure actuators may be used, one for driving the jaws radially inwardly and one for driving the jaws radially outwardly. In the preferred embodiment described herein below in greater detail a double acting axial actuator is described, this is linked to the jaws by a lever mechanism although it will be well appreciated that any alternative form of linkage could be used, such as cams, wedges, scroll plate or the like. Similarly the actuator or actuators need not be axially aligned but could be aligned in any suitable manner.

Derivation of power from the rotation of the chuck when mounted on a spindle of a machine tool requires the cooperation of a suitable fixed part of the machine tool. If no such suitable fixed part is available, such may be provided for attachment to the machine tool when a chuck formed as an embodiment of the invention is initially fitted. Thereafter, the same cooperating part may serve for any chuck of this type which is interchanged with the one initially fitted, for the same purpose. The fixed cooperating part serves to actuate one or more fluid pumps which serve as the source of power for the chuck or to hold stationary a part of the chuck body which does not rotate with the machine tool spindle.

Where the power is produced as fluid pressure the energy storage means may take the form of fluid pressure reservoirs or absorbers housed in the chuck body. In the case of a pneumatically operated chuck the absorbers may simply be chambers with suitably throttled ports, and in the case of a hydraulically operated chuck the reservoirs may take the form of cylinders in the body with resiliently biased pistons which move to compress the resilient biasing means thereof as the pressure within the reservoir increases. The resilient biasing means may be a spring or springs or alternatively may be gas pressure within a closed chamber housing the fluid piston.

In the preferred embodiment of the invention the energy storage means are provided in the form of two fluid pressure reservoirs or absorbers housed in the chuck body, the said means for generating fluid pressure acting to pump fluid from one reservoir to the other. In such an embodiment it is preferred that there are four valves interlinking the said double acting actuator and the said two reservoirs, and a control member operable to selectively open or close the said valves to connect one side of the actuator to one reservoir and the other side of the actuator to the other reservoir.

Preferably the four valves are all mounted with their operating members projecting radially outwardly, and the control member comprises a control ring having cam faces thereon for operation of the valves.

The fluid pressure generating means may comprise a plurality of pumps operated by relative rotation of a movable part of the chuck, which turns with the spindle of a machine tool, and a fixed part of the chuck, which is adapted to be non-rotatably mounted on a machine tool. Preferably the plurality of pumps are arranged in a circle with their operative plungers extending axially of the chuck body and positioned for engagement with a swash plate with which they are relatively rotatable.

It is preferred that there are provided adjuster means for varying the inclination of the swash plate with respect to the axis of the machine. This has the effect of adjusting the stroke of the pumps and hence the pressure stored in the energy storage means.

This variation of pressure causes a variation in the force applied by the jaws.

In the preferred embodiment the actuator comprises a tube slidable axially within a bore in the chuck body, linked at or adjacent one end thereof to the jaws of the chuck by a linkage which transmits axial movement of the actuator as radial movement of the jaws, and having a radial annular flange at or adjacent the other end thereof, which flange is sealed within a first annular recess in the bore in the chuck body, which recess serves as an actuator cylinder separated into two annular chambers by the piston formed by the said annular flange. Similarly, it is preferred that the fluid pressure reservoir or reservoirs within the chuck body are formed by a second annular recess in the said axial bore in the chuck body, which recess houses an annular piston separating the recess into first and second chambers forming the said first and second reservoirs, the annular piston being resiliently biased towards one end of the recess. In this case, however, it is necessary to provide a resiliently deformable chamber within the chuck body, communicating with the said first and second reservoirs and acting as an auxiliary reservoir to accommodate transient changes in pressure as the jaws of the chuck are operated.

The chuck may be adapted for completely automatic operation by making the control member, or the valves which distribute the fluid pressure, electrically operable. The electricity supply may then be fed in to the chuck via the spindle and suitable control signals used to cause the jaws of the chuck to open or close as required.

The choice of whether to use one or more reservoirs as the energy storage means depends in part on the fluid used for the chuck. If the chuck is pneumatically operated a single reservoir is the minimum, but if a hydraulic fluid is used then at least two reservoirs are required since the fluid circuit must be self contained. In operation fluid is transferred from one reservoir to another. Preferably the arrangement is such that a plurality of pumps transfer the fluid from a first or lower pressure reservoir to a second or higher pressure reservoir upon rotation of the chuck, fluid flowing from the second reservoir towards the first reservoir upon control movement of the chuck. The first reservoir is preferably maintained at a pressure greater than atmospheric in order to ensure proper filling of the pumps when operating at high speed and also to ensure that air cannot leak or be drawn into the chuck and thereby causes aeration of the fluid.

It is preferred that embodiments of the present invention are provided with a safety interlock for the jaws, to prevent these from being unclamped when the chuck is rotating. Similarly, there may be provided a suitable interlock device preventing operation of the motor when the jaws are unclamped. Since the chuck may be used for inner or outer clamping, a mechanism for identifying the clamping direction is required.

One embodiment of the invention will now be more particularly described, by way of example, with reference to the accompanying drawings, in which.

Figure 2:
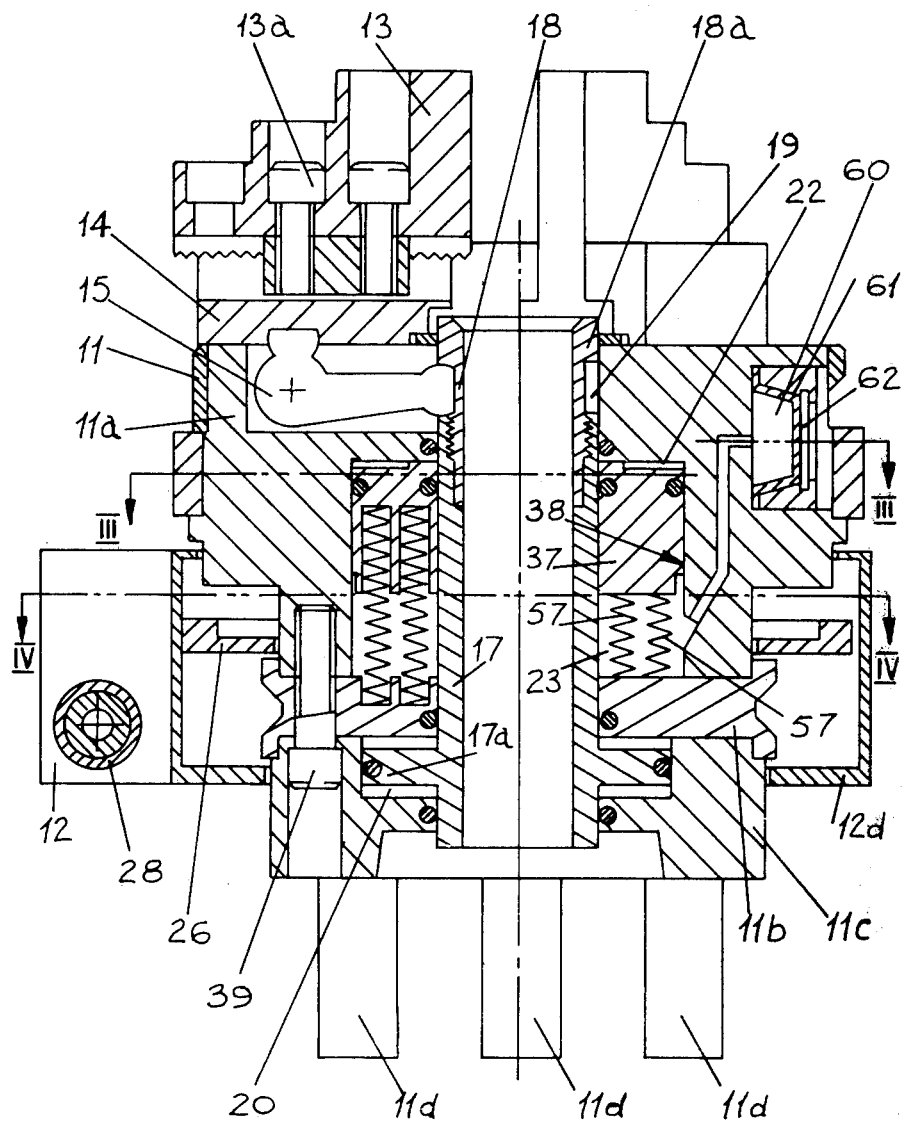
FIG. 2 is an axial section of a practical embodiment of the invention.
Figure 3:
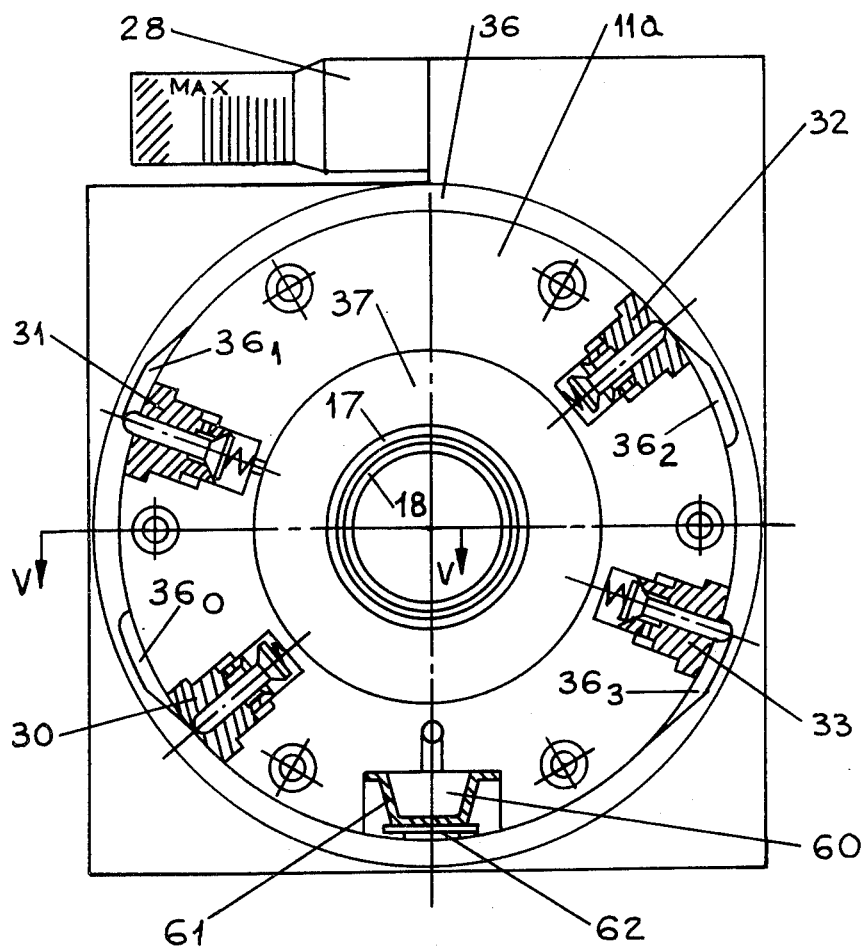
FIG. 3 is a cross section on the line III—III of FIG. 2.

Referring now to the drawings there is shown a chuck comprising a rotatable body 11 in three parts 11a, 11b and 11c which are joined together by fixing screws 39 and are mounted rotatably within a fixed body 12 by means of rollers 44, 45, 46, 47 (see FIG. 4) which are carried on one wall 12a of the fixed body 12 of the chuck and roll in a V-shape annular groove in the intermediate part 11b of the chuck body 11. When mounted on a machine tool the rotatable body 11 will be secured to the spindle in a known way, for example by means of the three axial pins 11d shown in FIG. 2, and the fixed part 12 of the body will be located against a fixed abutment on the machine tool so that the rotatable part 11 of the body can rotate with respect thereto.

Figure 1:
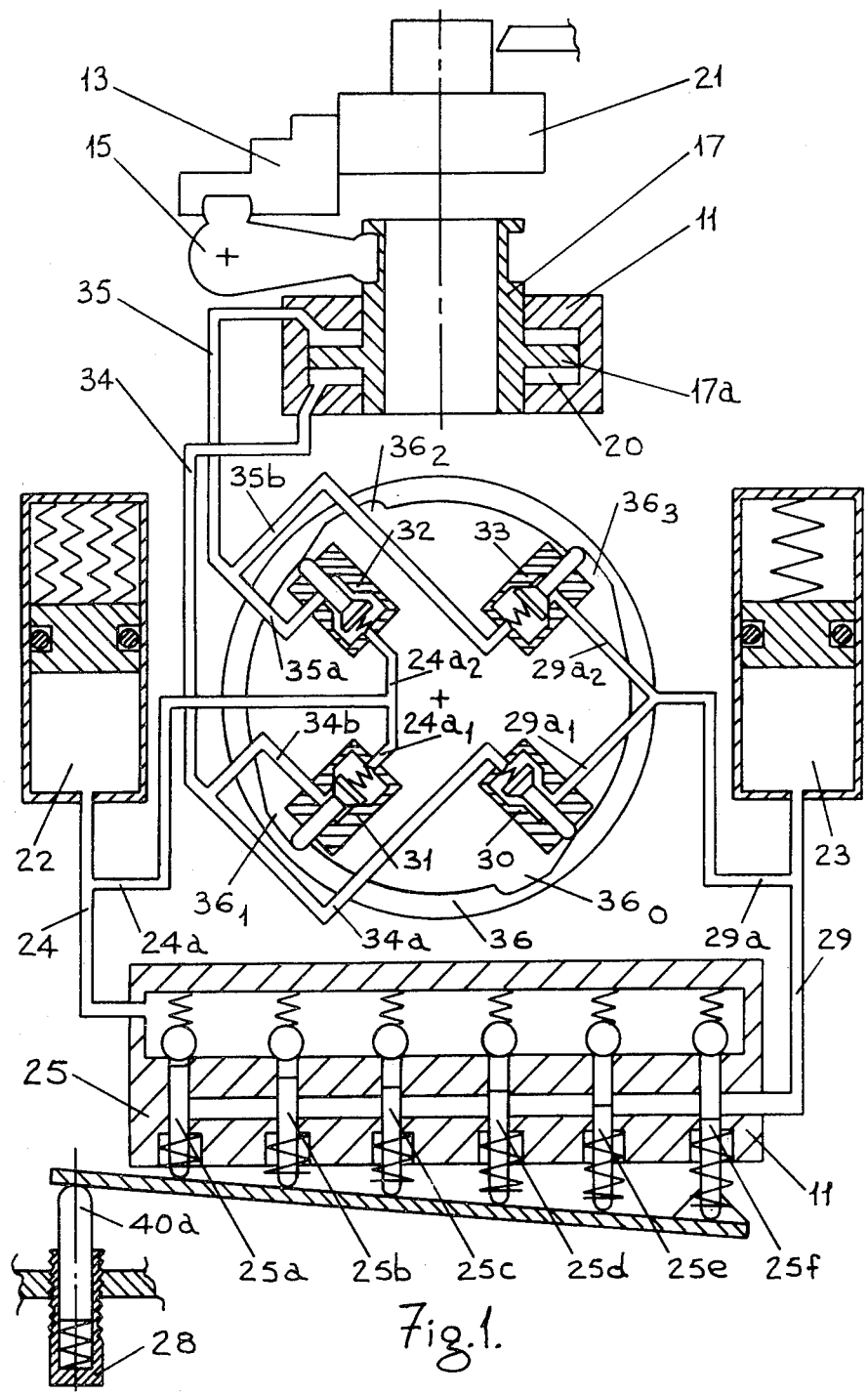
FIG. 1 is a schematic diagram illustrating the operating circuit of one embodiment of a chuck made according to the invention.

In the schematic diagram of FIG. 1 the body 11 is shown in two parts represented by the outlines 11 for convenience. The chuck has radially movable jaws 13 which are fixed by screws 13a to slidable elements 14 carried on the body 11. In the rear face of the elements 14 are formed recesses 16 engaged by one arm of a respective bellcrank lever 15 the other arm of which engages in an annular recess 19 in an actuator tube 17 housed in a bore in the chuck body 11. The recess 19 is, in fact, formed between the end of the actuator tube 17 and an axial insert 18 which is threaded into the end of the actuator tube 17 and has a radial flange 18a which defines, together with the end face of the actuator 17, the annular recess 19 into which the radial arms of the bellcrank levers 15 engage.

Opening and closing movements of the jaws 13 are effected by axial movement of the actuator tube 17 to cause rotation of the levers 15 in a known way. The actuator tube 17 has a radial flange 17a adjacent the end remote from the recess 19 and this flange is housed sealingly within a first annular recess 20 in the bore in the chuck body 11 to act as a piston, separating the recess 20 into two chambers which can respectively be fed with high and low pressure from a pressure source to cause axial movement of the actuator tube 17 in one direction or the other.

Figure 5:
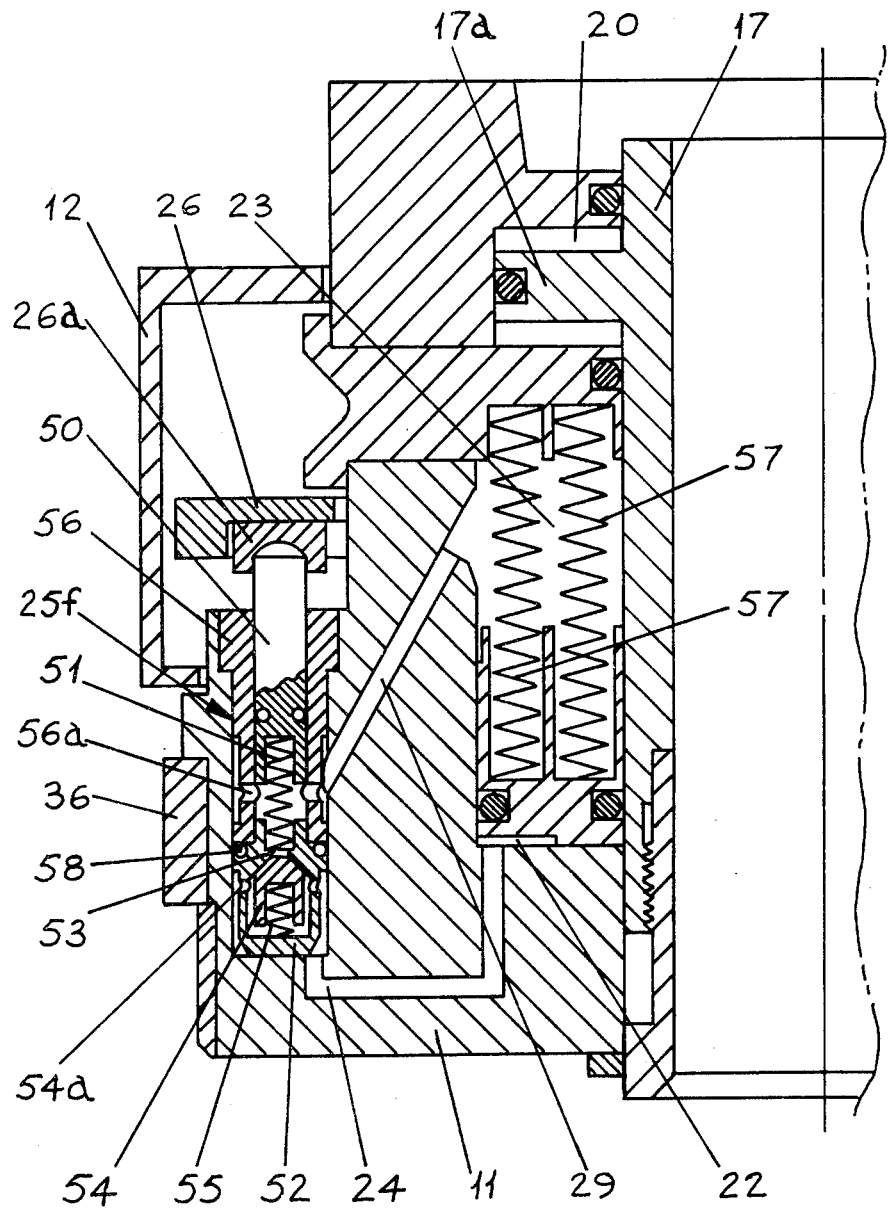
FIG. 5 is a scrap section on the line V—V of FIG. 4.

The pressure source of the chuck feeds a reservoir 22 and comprises an array of fluid pumps 25 which are automatically actuated by rotation of the chuck, when mounted on a machine tool spindle. There are six pumps 25a, 25b, 25c, 25d, 25e, 25f in the array of pumps 25, arranged in a circle around the chuck body 11. The pump 25f is illustrated in detail in FIG. 5 and will be described in greater detail below.

Basically, each pump comprises a plunger sliding in a bore at one end of which is a unidirectional valve. The bores along which the plungers of the pumps 25a–25f slide are connected together by a conduit 29 to a low pressure reservoir 23 and the action of the pumps as the plungers are reciprocated along their bores is to draw fluid from the low pressure reservoir 23 and to pump it under pressure via a conduit 24 to the high pressure reservoir 22. Sequential actuation of the plungers of the pumps 25a–25f is effected by means of a swash plate 26 which is mounted in the fixed part 12 of the chuck body so as to be held rigid as the array of pumps 25 is rotated with the body 11. The swash plate 26 is pivoted at one end 27 and has an adjuster 28 by which its inclination to the axis of rotation of the chuck body 11 can be adjusted to determine the length of stroke of each plunger of the pump 25.

The high pressure reservoir 22 fed by the pump array 25 is connected by a conduit 24a and two branch conduits 24a$_1$ and 24a$_2$ to respective valves 31, 32 mounted within the chuck body 11, and the low pressure reservoir 23 is connected by a conduit 29a and respective branch conduits 29a$_1$, 29a$_2$ to respective valves 30, 33. The valves 30, 31, 32, 33 are simple open/shut valves having radially extending plungers which are engaged by a control ring 36 mounted on the chuck body for limited turning movement thereabout. The valves are opened by depression of the plunger, and spring biased to shut. The control ring has four recesses 36$_0$, 36$_1$, 36$_2$, 36$_3$ forming cam surfaces for operation of the four valves 30, 31, 32, 33. The four valves 30–33 are arranged diametrically opposite one another in pairs and the positions of the recesses 36$_0$–36$_3$ are so arranged that opposite pairs of valves are opened or closed together. Thus, in the position shown in FIG. 1, the valves 30 and 32 are open, and the valves 31 and 33 are shut since their plungers extend into the respective recesses 36$_1$, 36$_3$. As will be seen from FIG. 1 the circuit is so arranged that the valves 31–33 connect one chamber of the first recess 20 in the actuator body 11 with the high pressure reservoir 22 and the other chamber with the low pressure reservoir 23, or vice versa in dependence on the position of the control ring 36. Thus, in one position of the control ring 36 the jaws are driven to open, and in the other position, that is the position shown in FIG. 1, the jaws are driven to close.

Figure 4:
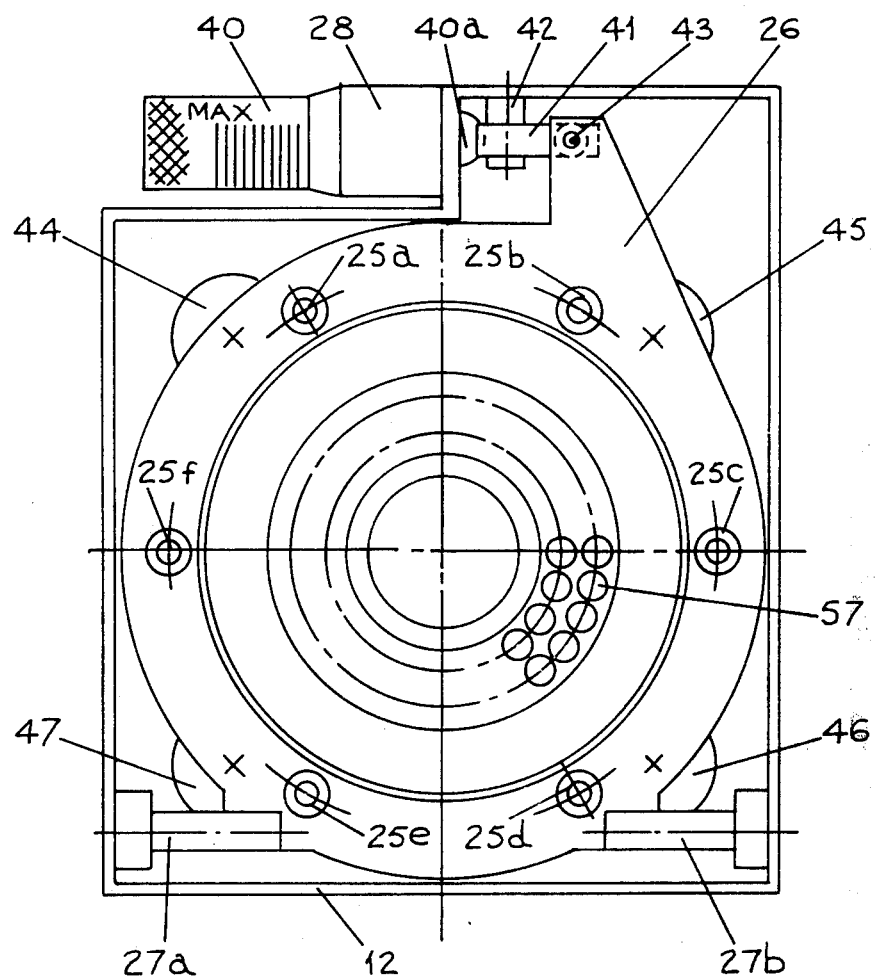
FIG. 4 is a cross section on the line IV—IV of FIG. 2.

The pressure with which the jaws close depends on the pressure to which the high pressure reservoir 22 is charged by the actuation of the pumps 25, and this in turn depends on the force with which the inclination of the swash plate 26 is maintained. The force applied to the swash plate is adjustable by the adjuster 28, which is shown in FIG. 4. The swash plate 26 is mounted in the fixed part 12 of the chuck body on two aligned pivots 27a, 27b located at a position opposite the position of the adjuster 28 which comprises a screwed adjuster body 40 screwed into a housing in the fixed body 12. The adjuster body 40 carries a spring loaded plunger 40a and can be screwed into or cut out of the fixed body 12. The plunger 40a engages one arm of a bellcrank 41 which is pivoted about a pivot pin 42 and the other arm of which engages at a point 43 with the swash plate 26. It will be appreciated that, as shown in FIG. 4, the bellcrank 41 is being viewed end on so that movement of the adjuster body 40 to the left or right will cause movement of point 43 into or out of the plane of the paper. The adjustment of the adjuster body 40 determines the biasing force applied to the swash plate by the spring loaded plunger 40a. As the pressure in the reservoir 22 increases the back pressure in the pumps 25 increase and the spring loaded plunger is forced back against the action of its biasing spring until the swash plate is perpendicular to the axis of rotation of the chuck body.

In the specific embodiment shown in FIGS. 2, 3, 4 and 5 the high and low pressure reservoirs are formed by a second recess in the bore in the chuck body 11, which is separated into two chambers by an annular piston 37 and which is biased, by a plurality of springs 57, in a direction such as to reduce the size of the high pressure reservoir 22. This configuration, however, requires the use of an auxiliary reservoir 60 which is formed by an annular resilient member 61, which can adjust to take up transient variations in pressure as the jaws are moved and before compensating movement of the annular piston 37 takes place. A transparent window 62 is provided for observing the state of the member 61.

The various conduits 24, 24a, 24a$_1$ and 24a$_2$ joining the array of pumps 25 to the high pressure reservoir and the two valves 31, 32 respectively, and the conduits joining the low pressure reservoir 23 to the pump and to the valves 30, 33 respectively, that is conduits 29, 29a, 29a$_1$ and 29a$_2$ are all formed by suitable drillings within the body 11 of the chuck, which drillings, however, are not all shown in the drawing. Likewise, the conduits connecting the four valves 30—33 to the two chambers of the recess 20 in the chuck body, that is conduits 34, 34a, 34b, 35, 35a and 35b are likewise formed by drillings within the chuck body, but are not shown in FIG. 2 to 5 of the drawings, apart from the conduit 29 which lies on one of the section lines In FIG. 5 there is shown in greater detail one of the pumps, that is the pump 25f. This pump comprises a plunger 50 one end of which engages in a channel in an annular element 26a carried on the swash plate 26. The plunger 50 is guided in a pump body 56 and biased towards the swash plate 26 by means of a spring 51 which is compressed between the plunger 50 and a valve body 52 which has an axial bore 53 therein. The bore 53 is closed by a movable valve member 54 biased into engagement with the valve body 52 by a spring 55. The pump body 56 has a radial passage 56a which communicates with an inclined drilling 29 in the chuck body 11, which leads to the low pressure reservoir 23. Similarly, the valve body 54, which is sealed from the pump body 56 by an annular sealing ring 58, has a radial passageway 54a which communicates with a conduit 24 leading to the high pressure reservoir 22. Thus, as the chuck body 11 rotates with respect to the chuck body 12, the plunger 50 slides around the channel in the annular element 26a of the swash plate 26 and, due to the inclination of the swash plate 26, reciprocates back and forth within the pump body 56. As the plunger 50 passes the radial opening 56 the lower part of the plunger bore is sealed and thus fluid is forced through the channel 53 against the action of the valve member 54 and finds its way via the conduit 24 into the high pressure reservoir 22. As the plunger 50 moves back up the bore, reverse flow from the conduit 24 is prevented by the valve member 54 being pressed against the valve body 52 by the spring 55, and accordingly a low pressure is formed in the region of the plunger bore between the opening 53 and the radial opening 56a. Consequently, when the plunger 50 is urged by the spring 51 past the radial opening 56a, fluid is drawn along the conduit 29 from the low pressure reservoir 23 into this region ready for a subsequent compression stroke as the plunger 50 is once again forced down the bore.

The reservoirs 22, 23 should be made sufficiently large to house enough fluid pressure for several adjusting movements, opening and closing the jaws 13, in order to ensure that the chuck will remain operative even if the workpiece is not properly positioned after two or three attempts. Even though utilising the mechanism several times will cause the pressure in the reservoirs 22, 23 to decrease, and therefore cause a corresponding reduction in the force with which the jaws 13 grip the workpiece, the pressure within the reservoirs 22, 23 is restored after several rotations of the chuck so that a full clamping force is applied by the chuck before any force is applied to the workpiece by the operating tool.

We claim:

1. In a power operated work holding chuck of the type having:
    a chuck body,
    radially movable jaws on the chuck body,
    fluid pressure operated actuator means,
    means linking said pressure operated actuator means to said jaws on said chuck body, whereby to transmit movement of said pressure operated actuator means to said jaws,
    the improvement wherein:
    said chuck body is formed in two parts which are secured together and rotatable with respect to one another, one of said chuck body parts housing said fluid pressure operated actuator means,
    means mounting one of said chuck body parts on a spindle of a machine tool,
    means defining fluid pressure reservoirs in one of said two chuck body parts,
    a power source comprising means within said two chuck body parts for generating, as said two chuck body parts rotate with respect to one another, fluid pressure for driving said fluid pressure operated actuator means, said power source acting to pump fluid from one said reservoir to the other,
    said fluid pressure generating means comprising a plurality of pumps operated by relative rotation of said two relatively rotatable parts of said chuck, said plurality of pumps being mounted in a circle on one of said two chuck body parts and having operating plungers associated therewith extending axially of the chuck bod,
    a swash plate carried on the other of said two chuck body parts, said swash plate being pivotally mounted to turn about an axis which lies in a plane defined by the free ends of the plungers of said pumps when they are not depressed, and
    resilient biasing means engaging said swash plate and urging it to a position in which it is inclined with respect to the said plane, said resilient biasing means permitting said swash plate to be displaced about said pivot thereof as the pressure delivered by said pumps increases until it lies substantially parallel to said plane defined by said free ends of said plungers.

2. The power operated chuck of claim 1, wherein there are provided adjuster means for varying the force applied by said resilient biasing means to maintain the inclination of said swash plate with respect to said plane defined by the free ends of the plungers of said pumps when they are not depressed whereby to adjust the maximum pressure delivered by said pumps.

3. In a power operated work holding chuck of the type having:
    a chuck body,
    radially movable jaws on the chuck body,
    fluid pressure operated actuator means,
    means linking said pressure operated actuator means to said jaws on said chuck body, whereby to transmit movement of said pressure operated actuator means to said jaws;
    the improvement wherein:
    said chuck body is formed in two parts which are secured together and rotatable with respect to one another, one of said chuck body parts housing said fluid pressure operated actuator means,
    means mounting one of said chuck body parts on a spindle of a machine tool,
    means defining fluid pressure reservoirs in one of said two chuck body parts,
    a power source comprising means within said two chuck body parts for generating, as said two chuck body parts rotate with respect to one another, fluid pressure for driving said fluid pressure actuator means, said power source acting to pump fluid from one said reservoir to the other,
    said fluid pressure operated actuator means being double acting,
    valve means interlinking said double acting fluid pressure actuator and said two reservoirs, said valve means having elongate operating members and being mounted on said chuck body with said operating members projecting radially outwardly,
    a control member of one of said two chuck body parts operating to selectively open or close said valve means to connect one side of said fluid pressure actuator means to one reservoir and the other side of said fluid pressure actuator means to the other reservoir, said control member comprising a control ring having cam faces thereon for operation of said valve means.

4. The power operated chuck of claim 3, wherein said actuator comprises a tube slidable axially within a bore in said one chuck body part,
    linkage means at or adjacent one end of said actuator tube linking it to said jaws of said chuck, which linkage means transmits axial movement of said actuator as radial movement to said jaws,
    a radial annular flange at or adjacent the other end of said actuator tube, said flange being sealingly engaged within a first annular recess in said bore in said chuck body, said first recess serving as an actuator cylinder and being separated into two annular chambers by the piston formed by said annular flange.

5. The power operated chuck of claim 4, wherein said fluid pressure reservoir or reservoirs within said chuck body are formed by a second annular recess in the said axial bore in said one chuck body part, an annular piston in said second recess, said annular piston separating said second recess into first and second chambers, said first chamber forming said first reservoir and said second chamber forming said second reservoir, and resilient biasing means biasing said annular piston towards one end of said second recess.

6. The power operated chuck of claim 5, wherein there are further provided means defining a resiliently deformable chamber within said chuck body, and means connecting said resiliently deformable chamber with one of said first and second reservoirs, whereby said resiliently deformable chamber acts as an auxiliary reservoir to accommodate transient changes in pressure as said jaws of said chuck are operated.

* * * * *